(12) United States Patent
Yang et al.

(10) Patent No.: US 12,539,265 B2
(45) Date of Patent: Feb. 3, 2026

(54) ANHYDROUS COMPOSITION FOR CARING FOR AND/OR MAKING UP KERATIN MATERIALS

(71) Applicant: L'OREAL, Paris (FR)

(72) Inventors: Ying Yang, Shanghai (CN); Xinwei Yu, Shanghai (CN); Saijuan Ni, Shanghai (CN)

(73) Assignee: L'OREAL, Paris (FR)

( * ) Notice: Subject to any disclaimer, the term of this patent is extended or adjusted under 35 U.S.C. 154(b) by 314 days.

(21) Appl. No.: 18/555,405

(22) PCT Filed: Apr. 30, 2021

(86) PCT No.: PCT/CN2021/091491
§ 371 (c)(1),
(2) Date: Oct. 13, 2023

(87) PCT Pub. No.: WO2022/227002
PCT Pub. Date: Nov. 3, 2022

(65) Prior Publication Data
US 2024/0207168 A1    Jun. 27, 2024

(51) Int. Cl.
| | |
|---|---|
| *A61K 8/891* | (2006.01) |
| *A61K 8/25* | (2006.01) |
| *A61K 8/26* | (2006.01) |
| *A61K 8/895* | (2006.01) |
| *A61Q 1/02* | (2006.01) |
| *A61Q 1/04* | (2006.01) |
| *A61Q 1/06* | (2006.01) |

(52) U.S. Cl.
CPC ............. *A61K 8/895* (2013.01); *A61K 8/25* (2013.01); *A61K 8/26* (2013.01); *A61K 8/891* (2013.01); *A61Q 1/06* (2013.01)

(58) Field of Classification Search
None
See application file for complete search history.

(56) References Cited

U.S. PATENT DOCUMENTS

| | | |
|---|---|---|
| 2009/0068238 A1 | 3/2009 | Themens et al. |
| 2015/0110884 A1* | 4/2015 | Arditty ................ A61Q 19/00 424/78.02 |
| 2017/0079902 A1 | 3/2017 | Dop et al. |
| 2018/0214369 A1 | 8/2018 | Ebanks et al. |

FOREIGN PATENT DOCUMENTS

| | | |
|---|---|---|
| CN | 103402485 A | 11/2013 |
| WO | WO 2013/182238 A1 | 12/2013 |
| WO | WO 2019/180387 A1 | 9/2019 |

OTHER PUBLICATIONS

International Search Report & Written Opinion mailed on Feb. 7, 2022 in PCT/CN2021/091491 filed on Apr. 30, 2021, (15 pages).
Preliminary French Search Report dated Feb. 17, 2022 in French Application 21 05948, (3 pages, with English Translation of Categories of Cited Documents).
Database GNPD [Online] MINTEL; Oct. 25, 2018 (Oct. 25, 2018), anonymous: "Matte Color Lipstick", XP055892812, Database accession No. 6076931, 3 pages.
Database GNPD [Online] MINTEL; Aug. 25, 2020 (Aug. 25, 2020), anonymous: "Liquid Lip Color", XP055892828, Database accession No. 8052237, 6 pages.
Database GNPD [Online) MINTEL; Sep. 15, 2017 (Sep. 15, 2017), anonymous: "Metallic Matte Lipstick", XP055892798, Database accession No. 5096197, 4 pages.
Database GNPD [Online] MINTEL; Jul. 26, 2018 (Jul. 26, 2018), anonymous: "Lip Colour'Ink The Lip Colour Buildable Intensity Long-Wear", XP055892827, Database accession No. 5807461, 5 pages.
Extended European Search Report issued Dec. 17, 2024 in European Patent Application No. 21938476.5, 6 pages.
Office Action issued Oct. 21, 2024, in corresponding Japanese Patent Application No. 2023-553350 (with English Translation), 7 pages.

\* cited by examiner

*Primary Examiner* — Brian Gulledge
(74) *Attorney, Agent, or Firm* — Oblon, McClelland, Maier & Neustadt, L.L.P.

(57) ABSTRACT

An anhydrous composition for caring for and/or making up keratin materials, which is liquid and comprises: a) at least one organopolysiloxane elastomer powder coated with a silicone resin; b) at least one organopolysiloxane elastomer conveyed in a first oil; c) at least two fillers including polymethylsilsesquioxane and calcium aluminum borosilicate; and d) at least one second oil, which is a volatile hydrocarbon oil, wherein the composition does not comprise a wax and comprises more than 15 wt % of fillers, relative to the total weight of the composition.

15 Claims, No Drawings

ANHYDROUS COMPOSITION FOR CARING FOR AND/OR MAKING UP KERATIN MATERIALS

TECHNICAL FIELD

The present invention relates to a composition for caring for and/or making up keratin materials. More particularly, the present invention relates to an anhydrous composition for caring for and/or making up keratin materials. The present invention also relates to a cosmetic process for caring for and/or making up keratin materials.

BACKGROUND ART

The development of formulations devoted to making up and/or caring for the skin and/or lips, having satisfactory properties in terms of application, of comfort, which are in particular non-greasy, of good coverage and in terms of make-up effect, is an ongoing objective.

The lipstick has become essential and is recognized by users as the overwhelmingly predominant method of application in caring for and/or making up their lips. Lipsticks are capable of altering the apparent facial characteristics of users. For example, narrow lips may be widened and broad lips narrowed. Besides altering the shape of the lips, lipsticks can be made in a great number of colors and shades to promote a desired effect or express the mood of the wearer.

However, it is not easy to apply some lipsticks and the mattress of the deposited layers produced remains inadequate.

Compositions for making up the skin or lips in the form of fluids, conventionally referred to as glosses in the context of making up the lips, are also known, which are generally devoid of waxes and which conventionally comprise at least one nonvolatile oil with a molecular weight of greater than 600 g/mol.

However, the deposited layers produced with such liquid compositions are generally relatively glossy and/or exhibit a feeling of greasiness on the lips, which is a source of discomfort to the user.

Meanwhile, some cosmetic products for caring for and/or making up keratin materials cannot provide a good coverage, which is not desired.

Therefore, there is still a need for a composition for caring for and/or making up keratin materials in particular the lips, which is easy to be applied, and capable of providing a matte deposit, and lightweight sensation.

SUMMARY OF THE INVENTION

An object of the present invention is thus to develop a composition for caring for and/or making up keratin materials in particular the lips, which is easy to be applied, and capable of providing a matte deposit, and lightweight sensation.

Another object of the present invention is to provide a cosmetic process for caring for and/or making up keratin materials such as the skin and the lips, in particular the lips, which will result a matte deposit with lightweight sensation on the keratin materials.

Thus, according to a first aspect, the present invention provides an anhydrous composition for caring for and/or making up keratin materials, which is liquid and comprises:
 a) at least one organopolysiloxane elastomer powder coated with a silicone resin;
 b) at least one organopolysiloxane elastomer conveyed in a first oil;
 c) at least two fillers including polymethylsilsesquioxane and calcium aluminum borosilicate; and
 d) at least one second oil, which is a volatile hydrocarbon oil, wherein the composition does not comprise a wax and comprises more than 15 wt. % of fillers, relative to the total weight of the composition.

According to a second aspect, the present invention provides a cosmetic process for caring for and/or making up keratin materials comprising applying the anhydrous composition as described above to the keratin materials.

It has been found that the anhydrous composition according to the present invention is easy to be applied, and capable of providing a matte deposit, and lightweight sensation.

Other subjects and characteristics, aspects and advantages of the invention will emerge even more clearly on reading the description and the examples that follow.

DETAIL DESCRIPTION OF THE INVENTION

As used herein, unless otherwise indicated, the limits of a range of values are included within this range, in particular in the expressions "between . . . and . . . " and "from . . . to . . . ".

As used herein, the term "comprising" is to be interpreted as encompassing all specifically mentioned features as well optional, additional, unspecified ones.

As used herein, the use of the term "comprising" also discloses the embodiment wherein no features other than the specifically mentioned features are present (i.e. "consisting of").

The expression "at least one" used in the present application is equivalent to the expression "one or more".

Unless otherwise defined, all technical and scientific terms used herein have the same meaning as commonly understood by those skilled in the field the present invention belongs to. When the definition of a term in the present description conflicts with the meaning as commonly understood by those skilled in the field the present invention belongs to, the definition described herein shall apply.

Unless otherwise specified, all numerical values expressing amount of ingredients and the like used in the description and claims are to be understood as being modified by the term "about". Accordingly, unless indicated to the contrary, the numerical values and parameters described herein are approximate values which are capable of being changed according to the desired performance obtained as required.

For the purposes of the present invention, the term "anhydrous" means that the composition according to the present invention contains less than 2 wt. % and preferably less than 0.5 wt. % of water relative to the total weight of the composition. Where appropriate, such small amounts of water may be provided by ingredients of the composition that contain it in residual amount, but are not deliberately provided.

The term "wax" is understood to mean a lipophilic compound, which is solid at ambient temperature (25° C.), with a reversible solid/liquid change in state, and which has a melting point of greater than or equal to 30° C. which can range up to 120° C.

All percentages in the present application refer to weight percentage, unless otherwise specified.

As used herein, the term "keratin materials" refer to the skin and the lips. By "skin", we intend to mean all the body skin, including the scalp. Preferably, the keratin material is the lips.

The anhydrous composition according to the present invention comprises:

a) at least one organopolysiloxane elastomer powder coated with a silicone resin;
b) at least one organopolysiloxane elastomer conveyed in a first oil;
c) at least two fillers including polymethylsilsesquioxane and calcium aluminum borosilicate; and
d) at least one second oil, which is a volatile hydrocarbon oil, wherein the composition does not comprise a wax and comprises more than 15 wt. % of fillers, relative to the total weight of the composition.

Preferably, the composition according to the present invention does not comprises a pasty compound.

The term "pasty fatty substance" is intended to denote a lipophilic fatty compound that undergoes a reversible solid/liquid change in state, that exhibits an anisotropic crystal organization in the solid state, and that comprises, at a temperature of 23° C., a liquid fraction and a solid fraction.

Organopolysiloxane Elastomer Powder Coated with a Silicone Resin

According to the first aspect of the present invention, the anhydrous composition comprises at least one organopolysiloxane elastomer powder coated with silicone resin, in particular silsesquioxane resin, as described, for example, in Patent U.S. Pat. No. 5,538,793, the content of which is incorporated by way of reference.

Such elastomeric powders are sold under the names KSP-100, KSP-101, KSP-102, KSP-103, KSP-104 and KSP-105 by the company Shin-Etsu, and have the INCI name: Vinyl Dimethicone/Methicone Silsesquioxane Crosspolymer.

Preferably, the organopolysiloxane elastomer powder coated with silicone resin is a compound having the INCI name: Vinyl Dimethicone/Methicone Silsesquioxane Crosspolymer.

Advantageously, the organopolysiloxane elastomer powder coated with silicone resin is present in the composition of the present invention in an amount ranging from 0.5 wt. % to 10 wt. %, preferably from 1 wt. % to 8 wt. %, more preferably from 2 wt. % to 5 wt. %, relative to the total weight of the composition.

Organopolysiloxane Elastomer Conveyed in a First Oil

According to the first aspect of the present invention, the anhydrous composition comprises at least one organopolysiloxane elastomer (also referred to as silicone elastomer) conveyed in a first oil, in particular in the form of an organopolysiloxane elastomer gel.

Preferably, the first oil is a silicone oil and/or a hydrocarbon oil, which is preferably non-volatile.

Preferably, the composition comprises at least one organopolysiloxane elastomer conveyed in at least one non-volatile silicone oil having the INCI name Dimethicone.

The term "organopolysiloxane elastomer" or "silicone elastomer" means a soft, deformable organopolysiloxane with viscoelastic properties and especially with the consistency of a sponge or soft sphere. Its modulus of elasticity is such that this material withstands deformation and has a limited capacity for extension and contraction. This material is capable of regaining its original shape after stretching.

It is more particularly a crosslinked silicone elastomer.

The silicone elastomer particles are conveyed in the form of a gel formed from an elastomeric organopolysiloxane included in at least one hydrocarbon oil and/or one silicone oil.

In these gels, the organopolysiloxane particles are often non-spherical particles.

Non-Emulsifying Organopolysiloxane Elastomer

Thus, the organopolysiloxane elastomer may be obtained by crosslinking addition reaction of diorganopolysiloxane containing at least one hydrogen bonded to silicon and of diorganopolysiloxane containing ethylenically unsaturated groups bonded to silicon, especially in the presence of a platinum catalyst; or by dehydrogenation crosslinking condensation reaction between a diorganopolysiloxane containing hydroxyl end groups and a diorganopolysiloxane containing at least one hydrogen bonded to silicon, especially in the presence of an organotin; or by crosslinking condensation reaction of a diorganopolysiloxane containing hydroxyl end groups and of a hydrolysable organopolysiloxane; or by thermal crosslinking of organopolysiloxane, especially in the presence of an organoperoxide catalyst; or by crosslinking of organopolysiloxane via high-energy radiation such as gamma rays, ultraviolet rays or an electron beam.

Preferably, the organopolysiloxane elastomer is obtained by crosslinking addition reaction (A) of diorganopolysiloxane containing at least two hydrogens each bonded to a silicon, and (B) of diorganopolysiloxane containing at least two ethylenically unsaturated groups bonded to silicon, especially in the presence (C) of a platinum catalyst.

In particular, the organopolysiloxane elastomer may be obtained by reaction of dimethylpolysiloxane containing dimethylvinylsiloxy end groups and of methylhydrogenopolysiloxane containing trimethylsiloxy end groups, in the presence of a platinum catalyst.

Compound (A) is the base reactant for the formation of elastomeric organopolysiloxane, and the crosslinking takes place via an addition reaction of compound (A) with compound (B) in the presence of the catalyst (C).

Compound (A) is in particular an organopolysiloxane containing at least two hydrogen atoms bonded to different silicon atoms in each molecule.

Compound (A) may have any molecular structure, especially a linear-chain or branched-chain structure or a cyclic structure.

Compound (A) may have a viscosity at 25° C. ranging from 1 to 50 000 centistokes, especially so as to be miscible with compound (B).

The organic groups bonded to the silicon atoms of compound (A) may be alkyl groups such as methyl, ethyl, propyl, butyl, octyl; substituted alkyl groups such as 2-phenylethyl, 2-phenylpropyl or 3,3,3-trifluoropropyl; aryl groups such as phenyl, tolyl, xylyl; substituted aryl groups such as phenylethyl; and substituted monovalent hydrocarbon groups such as an epoxy group, a carboxylate ester group or a mercapto group.

Compound (A) may thus be chosen from methylhydrogenopolysiloxanes containing trimethylsiloxy end groups, dimethylsiloxane-methylhydrogenosiloxane copolymers containing trimethylsiloxy end groups, and dimethylsiloxane-methylhydrogenosiloxane cyclic copolymers.

Compound (B) is advantageously a diorganopolysiloxane containing at least two lower alkenyl groups (for example $C_2$-$C_4$); the lower alkenyl group may be chosen from vinyl, allyl and propenyl groups. These lower alkenyl groups may be located in any position of the organopolysiloxane molecule, but are preferably located at the ends of the organopolysiloxane molecule. The organopolysiloxane (B) may have a branched-chain, linear-chain, cyclic or network structure, but the linear-chain structure is preferred. Compound (B) may have a viscosity ranging from the liquid state to the gum state. Preferably, compound (B) has a viscosity of at least 100 centistokes at 25° C.

Besides the abovementioned alkenyl groups, the other organic groups bonded to the silicon atoms in compound (B) may be alkyl groups such as methyl, ethyl, propyl, butyl or octyl; substituted alkyl groups such as 2-phenylethyl, 2-phenylpropyl or 3,3,3-trifluoropropyl; aryl groups such as phenyl, tolyl or xylyl; substituted aryl groups such as phenylethyl; and substituted monovalent hydrocarbon groups such as an epoxy group, a carboxylate ester group or a mercapto group.

The organopolysiloxanes (B) may be chosen from methylvinylpolysiloxanes, methylvinylsiloxane-dimethylsiloxane copolymers, dimethylpolysiloxanes containing dimethylvinylsiloxy end groups, dimethylsiloxane-methylphenylsiloxane copolymers containing dimethylvinylsiloxy end groups, dimethylsiloxane-diphenylsiloxane-methylvinylsiloxane copolymers's containing dimethylvinylsiloxy end groups, dimethylsiloxane-methylvinylsiloxane copolymers containing trimethylsiloxy end groups, dimethylsiloxane-methylphenylsiloxane-methylvinylsiloxane copolymers containing trimethylsiloxy end groups, methyl(3,3,3-trifluoropropyl)polysiloxanes containing dimethylvinylsiloxy end groups, and dimethylsiloxane-methyl(3,3,3-trifluoropropyl)siloxane copolymers containing dimethylvinylsiloxy end groups.

In particular, the organopolysiloxane elastomer may be obtained by reaction of dimethylpolysiloxane containing dimethylvinylsiloxy end groups and of methylhydrogenopolysiloxane containing trimethylsiloxy end groups, in the presence of a platinum catalyst.

According to another alternative form, compound (B) may be an unsaturated hydrocarbon compound containing at least two lower alkenyl groups (for example $C_2$-$C_4$); the lower alkenyl group may be chosen from vinyl, allyl and propenyl groups. These lower alkenyl groups may be located in any position of the molecule, but are preferably located at the ends. By way of example, mention may be made of hexadiene, in particular of 1,5-hexadiene.

Advantageously, the sum of the number of ethylenic groups per molecule in compound (B) and of the number of hydrogen atoms bonded to silicon atoms per molecule in compound (A) is at least 5.

It is advantageous for compound (A) to be added in an amount such that the molecular ratio between the total amount of hydrogen atoms bonded to silicon atoms in compound (A) and the total amount of all the ethylenically unsaturated groups in compound (B) is within the range from 1.5/1 to 20/1.

Compound (C) is the catalyst for the crosslinking reaction, and is especially chloroplatinic acid, chloroplatinic acid-olefin complexes, chloroplatinic acid-alkenylsiloxane complexes, chloroplatinic acid-diketone complexes, platinum black and platinum on a support.

The catalyst (C) is preferably added in an amount of from 0.1 to 1000 parts by weight and better still from 1 to 100 parts by weight, as clean platinum metal, per 1000 parts by weight of the total amount of compounds (A) and (B).

The elastomer is advantageously a non-emulsifying elastomer.

The term "non-emulsifying" defines organopolysiloxane elastomers not containing any hydrophilic chains, and in particular not containing any polyoxyalkylene units (especially polyoxyethylene or polyoxypropylene) or any polyglyceryl units.

The organopolysiloxane elastomer particles are preferably conveyed in the form of a gel formed from an elastomeric organopolysiloxane included in at least one hydrocarbon oil and/or one silicone oil, as defined below. In these gels, the organopolysiloxane particles may be spherical or non-spherical particles.

Spherical non-emulsifying elastomers that may be used include, for example, those sold under the names DC 9040, DC 9041, DC 9509, DC 9505 by the company Dow Corning.

Use may also be made of those sold under the names KSG-6, KSG-15, KSG-16, KSG-18, KSG-41, KSG-42, KSG-43 and KSG-44 by the company Shin-Etsu; Gransil SR 5CYC Gel, Gransil SR DMF 10 Gel and Gransil SR DC556 Gel from the company Gransil RPS from Grant Industries; 1229-02-167, 1229-02-168 and SFE 839 from the company General Electric.

According to a preferred embodiment, the composition according to the invention comprises, as organopolysiloxane elastomer conveyed in an oil, a non-emulsifying elastomer, preferably spherical, preferably chosen from the compounds sold under the names DC 9040, DC 9041, DC 9509, DC 9505 by the company Dow Corning.

According to one particular embodiment, elastomers may be used as a mixture with a cyclic silicone oil. An example that may be mentioned is the mixture of crosslinked organopolysiloxane/cyclopentasiloxane or a mixture of crosslinked organopolysiloxane/cyclohexasiloxane, for instance Gransil RPS D5 or Gransil RPS D6 from the company Grant Industries.

Emulsifying Organopolysiloxane Elastomer

According to another embodiment, the composition according to the invention comprises, as organopolysiloxane elastomer conveyed in an oil, an emulsifying elastomer.

The term "emulsifying organopolysiloxane elastomer" means an organopolysiloxane elastomer comprising at least one hydrophilic chain, such as polyoxyalkylenated organopolysiloxane elastomers and polyglycerolated silicone elastomers.

The emulsifying organopolysiloxane elastomer may be chosen from polyoxyalkylenated organopolysiloxane elastomers.

The polyoxyalkylenated organopolysiloxane elastomer is a crosslinked organopolysiloxane elastomer that may be obtained by crosslinking addition reaction of diorganopolysiloxane containing at least one hydrogen bonded to silicon and of a polyoxyalkylene containing at least two ethylenically unsaturated groups.

Preferably, the polyoxyalkylenated organopolysiloxane elastomer is obtained by crosslinking addition reaction (A1) of diorganopolysiloxane containing at least two hydrogens each bonded to a silicon, and (B1) of polyoxyalkylene containing at least two ethylenically unsaturated groups, especially in the presence (C1) of a platinum catalyst, as described, for instance, in Patents U.S. Pat. Nos. 5,236,986 and 5,412,004.

In particular, the organopolysiloxane may be obtained by reaction of polyoxyalkylene (especially polyoxyethylene and/or polyoxypropylene) containing dimethylvinylsiloxy end groups and of methylhydrogenopolysiloxane containing trimethylsiloxy end groups, in the presence of a platinum catalyst.

The organic groups bonded to the silicon atoms of compound (A1) may be alkyl groups containing from 1 to 18 carbon atoms, such as methyl, ethyl, propyl, butyl, octyl, decyl, dodecyl (or lauryl), myristyl, cetyl or stearyl; substituted alkyl groups such as 2-phenylethyl, 2-phenylpropyl or 3,3,3-trifluoropropyl; aryl groups such as phenylethyl; and substituted monovalent hydrocarbon groups such as an epoxy group, a carboxylate ester group or a mercapto group.

Compound (A1) may thus be chosen from methylhydrogenopolysiloxanes containing trimethylsiloxy end groups, dimethylsiloxane-methylhydrogenosiloxane copolymers containing trimethylsiloxy end groups, dimethylsiloxane-methylhydrogenosiloxane cyclic copolymers, dimethylsiloxane-methylhydrogenosiloxane-laurylmethylsiloxane copolymers containing trimethylsiloxy end groups.

Compound (C1) is the catalyst for the crosslinking reaction, and is especially chloroplatinic acid, chloroplatinic acid-olefin complexes, chloroplatinic acid-alkenylsiloxane complexes, chloroplatinic acid-diketone complexes, platinum black and platinum on a support.

Advantageously, the polyoxyalkylenated organopolysiloxane elastomers may be formed from divinyl compounds, in particular polyoxyalkylenes containing at least two vinyl groups, which react with Si—H bonds of a polysiloxane.

Polyoxyalkylenated elastomers are especially described in Patents U.S. Pat. Nos. 5,236,986, 5,412,004, 5,837,793 and 5,811,487, the content of which is incorporated by reference.

Polyoxyalkylenated organopolysiloxane elastomers that may be used include those sold under the names KSG-21, KSG-20, KSG-30, KSG-31, KSG-32, KSG-33, KSG-210, KSG-310, KSG-320, KSG-330 and KSG-340 by the company Shin-Etsu, and DC9010 and DC9011 by the company Dow Corning.

The emulsifying organopolysiloxane elastomer may also be chosen from polyglycerolated organopolysiloxane elastomers.

The polyglycerolated organopolysiloxane elastomer according to the invention is an organopolysiloxane elastomer that may be obtained by crosslinking addition reaction of diorganopolysiloxane containing at least one hydrogen bonded to silicon and of polyglycerolated compounds containing ethylenically unsaturated groups, especially in the presence of a platinum catalyst.

Preferably, the organopolysiloxane elastomer is obtained by crosslinking addition reaction (A2) of diorganopolysiloxane containing at least two hydrogens each bonded to a silicon, and (B2) of glycerolated compounds containing at least two ethylenically unsaturated groups, especially in the presence (C2) of a platinum catalyst.

In particular, the organopolysiloxane may be obtained by reaction of a polyglycerolated compound containing dimethylvinylsiloxy end groups and of methylhydrogenopolysiloxane containing trimethylsiloxy end groups, in the presence of a platinum catalyst.

Compound (A2) is the base reactant for the formation of an organopolysiloxane elastomer, and the crosslinking is performed by addition reaction of compound (A2) with compound (B2) in the presence of the catalyst (C2).

Compound (A2) is in particular an organopolysiloxane containing at least two hydrogen atoms bonded to different silicon atoms in each molecule.

Compound (A2) may have any molecular structure, especially a linear-chain or branched-chain structure or a cyclic structure.

Compound (A2) may have a viscosity at 25° C. ranging from 1 to 50 000 centistokes, especially so as to be miscible with compound (B2).

The organic groups bonded to the silicon atoms in compound (A2) may be alkyl groups containing from 1 to 18 carbon atoms, such as methyl, ethyl, propyl, butyl, octyl, decyl, dodecyl (or lauryl), myristyl, cetyl or stearyl; substituted alkyl groups such as 2-phenylethyl, 2-phenylpropyl or 3,3,3-trifluoropropyl; aryl groups such as phenyl, tolyl or xylyl; substituted aryl groups such as phenylethyl; and substituted monovalent hydrocarbon groups such as an epoxy group, a carboxylate ester group or a mercapto group.

Preferably, the said organic group is chosen from methyl, phenyl and lauryl groups.

Compound (A2) may thus be chosen from methylhydrogenopolysiloxanes containing trimethylsiloxy end groups, dimethylsiloxane-methylhydrogenosiloxane copolymers containing end trimethylsiloxy groups, dimethylsiloxane-methylhydrogenosiloxane cyclic copolymers and dimethylsiloxane-methylhydrogenosiloxane-laurylmethylsiloxane copolymers containing trimethylsiloxy end groups.

Compound (B2) may be a polyglycerolated compound corresponding to formula (B') below:

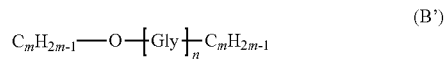

$$C_mH_{2m-1}-O-[Gly]_n-C_mH_{2m-1} \quad (B')$$

in which m is an integer ranging from 2 to 6, n is an integer ranging from 2 to 200, preferably ranging from 2 to 100, preferably ranging from 2 to 50, preferably ranging from 2 to 20, preferably ranging from 2 to 10 and preferentially ranging from 2 to 5, and in particular n is equal to 3; Gly denotes:

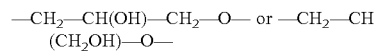

—CH$_2$—CH(OH)—CH$_2$—O— or —CH$_2$—CH(CH$_2$OH)—O—

Advantageously, the sum of the number of ethylenic groups per molecule in compound (B2) and of the number of hydrogen atoms bonded to silicon atoms per molecule in compound (A2) is at least 4.

It is advantageous for compound (A2) to be added in an amount such that the molecular ratio between the total amount of hydrogen atoms bonded to silicon atoms in compound (A2) and the total amount of all the ethylenically unsaturated groups in compound (B2) is within the range from 1/1 to 20/1.

Compound (C2) is the catalyst for the crosslinking reaction, and is especially chloroplatinic acid, chloroplatinic acid-olefin complexes, chloroplatinic acid-alkenylsiloxane complexes, chloroplatinic acid-diketone complexes, platinum black and platinum on a support.

The catalyst (C2) is preferably added in an amount of from 0.1 to 1000 parts by weight and better still from 1 to 100 parts by weight, as clean platinum metal, per 1000 parts by weight of the total amount of compounds (A2) and (B2).

The polyglycerolated organopolysiloxane elastomer is conveyed in gel form in at least one hydrocarbon oil and/or one silicone oil. In these gels, the polyglycerolated elastomer is often in the form of non-spherical particles.

Polyglycerolated organopolysiloxane elastomers that may be used include those sold under the names KSG-710, KSG-810, KSG-820, KSG-830 and KSG-840 by the company Shin-Etsu.

Preferably, the silicone elastomer conveyed in a first oil is non-emulsifying and is preferably devoid of a hydrophilic chain and in particular devoid of polyoxyalkylene units and polyglyceryl units.

Advantageously, the organopolysiloxane elastomer under consideration according to the invention is chosen from spherical non-emulsifying organopolysiloxane elastomers, polyglycerolated organopolysiloxane elastomers and polyoxyalkylenated organopolysiloxane elastomers.

Advantageously, the organopolysiloxane elastomer under consideration according to the invention is chosen from spherical non-emulsifying organopolysiloxane elastomers.

More particularly, the organopolysiloxane elastomer is obtained by crosslinking addition reaction (A) of diorganopolysiloxane containing at least two hydrogens each bonded to a silicon, and (B) of diorganopolysiloxane containing at least two ethylenically unsaturated groups bonded to silicon, especially in the presence of a platinum catalyst (C).

The composition thus comprises an organopolysiloxane elastomer conveyed in a non-volatile oil in combination with at least one organopolysiloxane elastomer powder coated with a silicone resin.

Preferably, the type organopolysiloxane elastomer conveyed in a first oil is selected from dimethicone/vinyl dimethicone crosspolymer, dimethicone crosspolymer, and mixtures thereof.

Advantageously, the organopolysiloxane elastomer conveyed in a first oil is present in the composition of the present invention in a total solids content ranging from 2 wt. % to 20 wt. %, preferably from 4 wt. % to 15 wt. %, more preferably from 6 wt. % to 10 wt. %, relative to the total weight of the composition.

In the composition according to the present invention, the organopolysiloxane elastomer(s) conveyed in a first oil and the organopolysiloxane elastomer(s) powder coated with a silicone resin are present in a ratio by weight on a dry basis of organopolysiloxane elastomer(s) conveyed in a first oil (i.e., the total solids content of organopolysiloxane elastomer(s) conveyed in a first oil)/organopolysiloxane elastomer(s) powder coated with a silicone resin (i.e., the total content of organopolysiloxane elastomer(s) coated with a silicone resin) of greater than 2, preferably of greater than 2.5.

The organopolysiloxane elastomer(s) conveyed in a first oil and the organopolysiloxane elastomer(s) powder coated with a silicone resin can be present in a ratio by weight on a dry basis of organopolysiloxane elastomer(s) conveyed in a first oil(i.e., the total solids content of organopolysiloxane elastomer(s) conveyed in a first oil)/organopolysiloxane elastomer(s) powder coated with a silicone resin (i.e., the total content of organopolysiloxane elastomer(s) coated with a silicone resin) of between 2 and 5, preferably between 2.5 and 4.

Advantageously, the composition according to the invention comprises a total content of organopolysiloxane elastomer(s) (i.e., =of organopolysiloxane elastomer(s) conveyed in a first oil+organopolysiloxane elastomer powder coated with a silicone resin) ranging from 2.5 wt. % to 30 wt. %, more preferably from 5 wt. % to 25 wt. %, more preferably from 8 wt. % to 15 wt. %, relative to the total weight of the composition.

The inventors found that the combination of organopolysiloxane elastomer conveyed in a first oil and organopolysiloxane elastomer(s) powder coated with a silicone resin can bring matte and soft focus finish on keratin materials.

Fillers

According to the first aspect of the present invention, the anhydrous composition comprises at least two fillers including polymethylsilsesquioxane and calcium aluminum borosilicate, and comprises more than 15 wt. % of fillers, relative to the total weight of the composition.

The term "fillers" should be understood as meaning colourless, inorganic or organic particles of any shape which are insoluble in the medium of the composition, irrespective of the temperature at which the composition is manufactured.

Mention may be made of talc, mica, silica, kaolin, bentone, fumed silica particles that have optionally been hydrophilically or hydrophobically treated, polyamide (Nylon®) powder (Orgasol® from Atochem, SP-500 from Toray (Dow Corning)), poly-ß-alanine powder and polyethylene powder, tetrafluoroethylene polymer (Teflon®) powders, lauroyllysine, starch, boron nitride, hollow polymer microspheres such as polyvinylidene chloride/acrylonitrile microspheres, for instance Expancel® (Nobel Industrie), acrylic acid copolymer microspheres (Polytrap® from the company Dow Corning) and silicone resin microbeads (for example Tospearls® from Toshiba), precipitated calcium carbonate, magnesium carbonate, basic magnesium carbonate, hydroxyapatite, hollow silica microspheres (Silica Beads® from Maprecos), glass or ceramic microcapsules (calcium aluminum borosilicate), and metal soaps derived from organic carboxylic acids containing from 8 to 22 carbon atoms and preferably from 12 to 18 carbon atoms, for example zinc stearate, magnesium stearate, lithium stearate, zinc laurate or magnesium myristate.

They may also be particles comprising a copolymer, the said copolymer comprising trimethylol hexyllactone. In particular, it may be a hexamethylene diisocyanate/trimethylol hexyllactone copolymer.

Such particles are especially commercially available, for example, under the name Plastic Powder D-400° or Plastic Powder D-800® from the company Toshiki.

Preferably, in addition to polymethylsilsesquioxane and calcium aluminum borosilicate, the composition according to the present invention comprises at least one other filler chosen from talc, mica, silica, polyamide powders, copolymers comprising trimethylol hexyllactone, preferably a hexamethylene diisocyanate/trimethylol hexyllactone copolymer, and mixture thereof.

More preferably, the composition comprises polymethylsilsesquioxane and calcium aluminum borosilicate and at least one other filler chosen from talc, mica, silica, polyamide powders, hexamethylene diisocyanate/trimethylol hexyllactone copolymer, and mixture thereof.

In some preferred embodiments, the composition comprises 0.1 wt. %-5 wt. %, preferably 1 wt. %-4 wt. % of polymethylsilsesquioxane, and 0.1 wt. %-5 wt. %, preferably 0.1 wt. %-0.5 wt. % of calcium aluminum borosilicate, relative to the total weight of the composition.

The inventors found that polymethylsilsesquioxane and calcium aluminum borosilicate can enhance matteness and soft focus benefit, meanwhile reinforce the gliding property of the composition according to the present invention.

Advantageously, the at least two fillers including polymethylsilsesquioxane and calcium aluminum borosilicate are present in the composition of the present invention in an amount ranging from 15 wt. % to 30 wt. %, preferably from 15 wt. % to 25 wt. %, more preferably from 15 wt. % to 20 wt. %, relative to the total weight of the composition.

Volatile Hydrocarbon Oil(s)

According to the first aspect of the present invention, the anhydrous composition comprises at least one second oil, which is a volatile hydrocarbon oil.

By "oil" it differs from the pasty compounds or waxes that are described in the present invention, in that the oils are liquid at room temperature (25° C.) and atmospheric pressure (760 mmHg).

The term"hydrocarbon oil" means an oil formed essentially from, or even constituted of, carbon and hydrogen atoms, and optionally oxygen and nitrogen atoms, and not containing any silicon or fluorine atoms. It may contain alcohol, ester, ether, carboxylic acid, amine and/or amide groups.

The term "volatile oil" means an oil that can evaporate on contact with the skin in less than one hour, at room temperature and atmospheric pressure. The volatile oil is a cosmetic volatile oil, which is liquid at room temperature. More specifically, a volatile oil has an evaporation rate of between 0.01 and 200 mg/cm$^2$/min, limits included.

To measure this evaporation rate, 15 g of oil or of oil mixture to be tested are placed in a crystallizing dish 7 cm in diameter, which is placed on a balance in a large chamber of about 0.3 m$^3$ that is temperature-regulated, at a temperature of 25° C., and hygrometry-regulated, at a relative humidity of 50%. The liquid is allowed to evaporate freely, without stirring it, while providing ventilation by means of a fan (Papst-Motoren, reference 8550 N, rotating at 2700 rpm) placed in a vertical position above the crystallizing dish containing said oil or said mixture, the blades being directed towards the crystallizing dish, 20 cm away from the bottom of the crystallizing dish. The mass of oil remaining in the crystallizing dish is measured at regular intervals. The evaporation rates are expressed in mg of oil evaporated per unit of area (cm$^2$) and per unit of time (minutes).

The volatile hydrocarbon oils suitable for the invention may be chosen from hydrocarbon oils having from 7 to 16 carbon atoms. The volatile hydrocarbon oils may be chosen from branched alkanes and linear alkanes.

Volatile hydrocarbon oils having from 7 to 16 carbon atoms that may especially be mentioned include branched $C_8$-$C_{16}$ alkanes, for instance $C_8$-$C_{16}$ isoalkanes (also known as isoparaffins), isododecane, isodecane, isohexadecane and, for example, the oils sold under the trade name Isopar or Permethyl, branched $C_8$-$C_{16}$ esters, for instance isohexyl neopentanoate, and mixtures thereof. Preferably, the volatile hydrocarbon oil having from 7 to 16 carbon atoms is chosen from isododecane, isodecane and isohexadecane, and mixtures thereof, and is especially isododecane.

As volatile hydrocarbon oils that may be used for the purposes of the present invention, mention may be made of linear alkanes, preferably of plant origin, comprising from 7 to 15 carbon atoms, in particular from 9 to 14 carbon atoms and more particularly from 11 to 13 carbon atoms.

As examples of linear alkanes that are suitable for the invention, mention may be made of n-heptane (C7), n-octane (C8), n-nonane (C9), n-decane (C10), n-undecane (C11), n-dodecane (C12), n-tridecane (C13), n-tetradecane (C14) and n-pentadecane (C15), and mixtures thereof, and in particular the mixture of n-undecane (C11) and n-tridecane (C13) described in Example 1 of patent application WO 2008/155 059 by the company Cognis. Mention may also be made of n-dodecane (C12) and n-tetradecane (C14) sold by Sasol under the references, respectively, Parafol 12-97 and Parafol 14-97, and also mixtures thereof.

Advantageously, the second oil, i.e. the volatile hydrocarbon oil is present in the composition of the present invention in an amount ranging from 10 wt. % to 40 wt. %, preferably from 10 wt. % to 25 wt. %, relative to the total weight of the composition.

Preferably, the composition according to the present invention further comprises at least one of (i) a non-volatile hydrocarbon oil; (ii) colorant, and (iii) mixtures thereof.

Non-Volatile Hydrocarbon Oil(s)

Optionally, the anhydrous composition comprises a non-volatile hydrocarbon oil.

The term "non-volatile oil" means an oil that remains on the skin or the keratin fiber at room temperature and atmospheric pressure. More precisely, a non-volatile oil has an evaporation rate strictly less than 0.01 mg/cm$^2$/min.

The non-volatile hydrocarbon oils that are suitable for the present invention may be chosen in particular from:

hydrocarbon oils of plant origin, such as triglycerides constituted of fatty acid esters of glycerol, the fatty acids of which may have chain lengths ranging from C4 to C28, these fatty acids possibly being linear or branched, and saturated or unsaturated; these oils are in particular wheatgerm oil, sunflower oil, beauty-leaf oil, grapeseed oil, sesame oil, corn oil, apricot oil, castor oil, shea oil, avocado oil, olive oil, soybean oil, sweet almond oil, cottonseed oil, hazelnut oil, macadamia oil, jojoba oil, palm oil, alfalfa oil, poppy oil, pumpkin oil, marrow oil, rapeseed oil, blackcurrant oil, evening primrose oil, millet oil, barley oil, quinoa oil, rye oil, safflower oil, candlenut oil, passion flower oil and musk rose oil; or alternatively caprylic/capric acid triglycerides such as those sold by the company Stearineries Dubois or those sold under the names Miglyol 8100, 812® and 818® by the company Sasol;

synthetic ethers having from 10 to 40 carbon atoms;

inear or branched hydrocarbons, of mineral or synthetic origin, such as liquid paraffin, liquid petroleum jelly, naphthalene oil, polybutylenes such as Indopol H-100 (molar mass or W=965 g/mol), Indopol H-300 (MW=1340 g/mol) and Indopol H-1500 (MW=2160 g/mol) sold or manufactured by the company Amoco, polyisobutenes, hydrogenated polyisobutenes such as Parleam® or Panalane H-300 E sold or manufactured by the company Amoco (MW=1340 g/mol), Viseal 20000 sold or manufactured by the company Synteal (MW=6000 g/mol) and Rewopal PIB 1000 sold or manufactured by the company Witco (MW=1000 g/mol), decene/butene copolymers, polybutene/polyisobutene copolymers, especially Indopol L-14, polydecenes and hydrogenated polydecenes such as Puresyn 10 (MW=723 g/mol) and Puresyn 150 (MW=9200 g/mol) sold or manufactured by the company Mobil Chemicals, and mixtures thereof;

synthetic esters and/or ethers such as the oils of formula R1COOR2 and/or R1OR2 in which R1 represents the residue of a linear or branched fatty acid comprising from 1 to 40 carbon atoms and R2 represents a hydrocarbon chain, in particular a branched hydrocarbon chain containing from 1 to 40 carbon atoms, on condition that the total number of carbons of R1+R2 is ≥ 10, such as for example purcellin oil (cetostearyl octanoate), isopropyl myristate, isopropyl palmitate, butyl stearate, C12 to C15 alkyl benzoate, hexyl laurate, diisopropyl adipate, isononyl isononanoate, 2-ethylhexyl palmitate, 2-hexyldecyl laurate, 2-octyldecyl palmitate, 2-octyldodecyl myristate or lactate, 2-diethylhexyl succinate, isostearyl isostearate, octanoates, decanoates or ricinoleates of alcohols or of polyalcohols, such as propylene glycol dioctanoate; hydroxylated esters such as isostearyl lactate and diisostearyl malate; lanolic acid, oleic acid, lauric acid or stearic acid esters; glyceryl or diglyceryl triisostearate; and pentaerythritol esters;

fatty alcohols that are liquid at room temperature, containing a branched and/or unsaturated carbon chain having from 12 to 26 carbon atoms, for instance cetanol, octyldodecanol, stearyl alcohol, linoleyl alcohol, linolenyl alcohol, isostearyl alcohol, oleyl alcohol, 2-hexyldecanol, 2-butyloctanol or 2-undecylpentadecanol;

fatty acids such as myristic acid, palmitic acid, stearic acid, behenic acid, oleic acid, linoleic acid, linolenic acid and isostearic acid; and mixtures thereof.

Preferably, the non-volatile hydrocarbon oil is selected from isostearyl isostearate, diisostearyl malate, hydrogenated polyisobutenes, and mixtures thereof.

Advantageously, if presents, the non-volatile hydrocarbon oil is present in the composition of the present invention in an amount ranging from 10 wt. % to 40 wt. %, preferably from 10 wt. % to 25 wt. %, relative to the total weight of the composition.

Colorant(s)

The solid anhydrous composition according to the present invention may optionally comprise at least one colorant. Preferably, the amount of colorant(s) is below 20 wt. % relative to the total weight of the composition.

For the purposes of the present invention, the term "colorant" means a compound that is capable of producing a colored optical effect when it is formulated in sufficient amount in a suitable cosmetic medium.

The colorant under consideration in the context of the present invention may be selected from water-soluble or water-insoluble, liposoluble or non-liposoluble, organic or inorganic colorants, and materials with an optical effect, and mixtures thereof.

Water-Soluble Dyes

The water-soluble colorants used according to the present invention are more particularly water-soluble dyes.

For the purposes of the present invention, the term "water-soluble dye" means any natural or synthetic, generally organic compound which is soluble in an aqueous phase or water-miscible solvents and which is capable of imparting colour. In particular, the term "water-soluble" is intended to characterize the capacity of a compound to dissolve in water, measured at 25° C., to a concentration at least equal to 0.1 g/l (production of a macroscopically isotropic, transparent, coloured or colourless solution). This solubility is in particular greater than or equal to 1 g/l.

As water-soluble dyes that are suitable for use in the present invention, mention may be made in particular of synthetic or natural water-soluble dyes, for instance FD&C Red 4 (CI: 14700), DC Red 6 (Lithol Rubine Na; CI: 15850), DC Red 22 (CI: 45380), DC Red 28 (CI: 45410 Na salt), DC Red 30 (CI: 73360), DC Red 33 (CI: 17200), DC Orange 4 (CI: 15510), FDC Yellow 5 (CI: 19140), FDC Yellow 6 (CI: 15985), DC Yellow 8 (CI: 45350 Na salt), FDC Green 3 (CI: 42053), DC Green 5 (CI: 61570), FDC Blue 1 (CI: 42090).

As non-limiting illustrations of sources of water-soluble colorant(s) that may be used in the context of the present invention, mention may be made in particular of those of natural origin, such as extracts of cochineal carmine, of beetroot, of grape, of carrot, of tomato, of annatto, of paprika, of henna, of caramel and of curcumin.

Thus, the water-soluble colorants that are suitable for use in the present invention are in particular carminic acid, betanin, anthocyans, enocyanins, lycopene, ß-carotene, bixin, norbixin, capsanthin, capsorubin, flavoxanthin, lutein, cryptoxanthin, rubixanthin, violaxanthin, riboflavin, rhodoxanthin, cantaxanthin and chlorophyll, and mixtures thereof.

They may also be copper sulfate, iron sulfate, water-soluble sulfopolyesters, rhodamine, betaine, methylene blue, the disodium salt of tartrazine and the disodium salt of fuchsin.

Some of these water-soluble colorants are in particular approved for food use. Representatives of these dyes that may be mentioned more particularly include dyes of the carotenoid family, referenced under the food codes E120, E162, E163, E160a-g, E150a, E101, E100, E140 and E141.

Pigments

The term "pigments" should be understood as meaning white or coloured, inorganic (mineral) or organic particles, which are insoluble in a liquid organic phase, and which are intended to color and/or opacify the composition and/or the deposit produced with the composition.

The pigments may be selected from mineral pigments, organic pigments and composite pigments (i.e. pigments based on mineral and/or organic materials).

The pigments may be selected from monochromatic pigments, lakes and pigments with an optical effect, for instance goniochromatic pigments and nacres.

The mineral pigments may be selected from metal oxide pigments such as chromium oxides, iron oxides (black, yellow, red), titanium dioxide, zinc oxides, cerium oxides and, zirconium oxides, chromium hydrate, manganese violet, Prussian blue, ultramarine blue, ferric blue, SYNTHETIC FLUORPHLOGOPITE, metal powders such as aluminium powders and copper powder, and mixtures thereof.

Organic lakes are organic pigments formed from a dye attached to a substrate.

The lakes, which are also known as organic pigments, may be selected from the materials below, and mixtures thereof:

cochineal carmine;

organic pigments of azo dyes, anthraquinone dyes, indigoid dyes, xanthene dyes, pyrene dyes, quinoline dyes, triphenylmethane dyes or fluorane dyes.

Among the organic pigments that may in particular be mentioned are those known under the following names: D&C Blue No. 4, D&C Brown No. 1, D&C Green No. 5, D&C Green No. 6, D&C Orange No. 4, D&C Orange No. 5, D&C Orange No. 10, D&C Orange No. 11, D&C Red No. 6, D&C Red No. 7, D&C Red No. 17, D&C Red No. 21, D&C Red No. 22, D&C Red No. 27, D&C Red No. 28, D&C Red No. 30, D&C Red No. 31, D&C Red No. 33, D&C Red No. 34, D&C Red No. 36, D&C Violet No. 2, D&C Yellow No. 7, D&C Yellow No. 8, D&C Yellow No. 10, D&C Yellow No. 11, FD&C Blue No. 1, FD&C Green No. 3, FD&C Red No. 40, FD&C Yellow No. 5, FD&C Yellow No. 6;

the organic lakes may be insoluble sodium, potassium, calcium, barium, aluminium, zirconium, strontium or titanium salts of acidic dyes such as azo, anthraquinone, indigoid, xanthene, pyrene, quinoline, triphenylmethane or fluorane dyes, these dyes possibly comprising at least one carboxylic or sulfonic acid group.

The organic lakes may also be supported on an organic support such as rosin or aluminium benzoate, for example.

Among the organic lakes, mention may be made in particular of those known under the following names: D&C Red No. 2 Aluminium lake, D&C Red No. 3 Aluminium lake, D&C Red No. 4 Aluminium lake, D&C Red No. 6 Aluminium lake, D&C Red No. 6 Barium lake, D&C Red No. 6 Barium/Strontium lake, D&C Red No. 6 Strontium lake, D&C Red No. 6 Potassium lake, D&C Red No. 7 Aluminium lake, D&C Red No. 7 Barium lake, D&C Red No. 7 Calcium lake, D&C Red No. 7 Calcium/Strontium lake, D&C Red No. 7 Zirconium lake, D&C Red No. 8 Sodium lake, D&C Red No. 9 Aluminium lake, D&C Red No. 9 Barium lake, D&C Red No. 9 Barium/Strontium lake, D&C Red No. 9 Zirconium lake, D&C Red No. 10 Sodium lake, D&C Red No. 19 Aluminium lake, D&C Red No. 19

Barium lake, D&C Red No. 19 Zirconium lake, D&C Red No. 21 Aluminium lake, D&C Red No. 21 Zirconium lake, D&C Red No. 22 Aluminium lake, D&C Red No. 27 Aluminium lake, D&C Red No. 27 Aluminium/Titanium/Zirconium lake, D&C Red No. 27 Barium lake, D&C Red No. 27 Calcium lake, D&C Red No. 27 Zirconium lake, D&C Red No. 28 Aluminium lake, D&C Red No. 30 lake, D&C Red No. 31 Calcium lake, D&C Red No. 33 Aluminium lake, D&C Red No. 34 Calcium lake, D&C Red No. 36 lake, D&C Red No. 40 Aluminium lake, D&C Blue No. 1 Aluminium lake, D&C Green No. 3 Aluminium lake, D&C Orange No. 4 Aluminium lake, D&C Orange No. 5 Aluminium lake, D&C Orange No. 5 Zirconium lake, D&C Orange No. 10 Aluminium lake, D&C Orange No. 17 Barium lake, D&C Yellow No. 5 Aluminium lake, D&C Yellow No. 5 Zirconium lake, D&C Yellow No. 6 Aluminium lake, D&C Yellow No. 7 Zirconium lake, D&C Yellow No. 10 Aluminium lake, FD&C Blue No. 1 Aluminium lake, FD&C Red No. 4 Aluminium lake, FD&C Red No. 40 Aluminium lake, FD&C Yellow No. 5 Aluminium lake and FD&C Yellow No. 6 Aluminium lake.

Mention may also be made of liposoluble dyes, such as, for example, Sudan Red, DC Red 17, DC Green 6, β-carotene, soybean oil, Sudan Brown, DC Yellow 11, DC Violet 2, DC Orange 5 and quinoline yellow.

The chemical substances corresponding to each of the organic colorants cited above are mentioned in the publication "International Cosmetic Ingredient Dictionary and Handbook", 1997 edition, pages 371 to 386 and 524 to 528, published by "The Cosmetic, Toiletries and Fragrance Association", the content of which is incorporated into the present patent application by way of reference.

The pigments may also have been subjected to a hydrophobic treatment.

The hydrophobic treatment agent may be selected from silicones such as methicones, dimethicones, alkoxysilanes and perfluoroalkylsilanes; fatty acids such as stearic acid; metal soaps such as aluminium dimyristate, the aluminium salt of hydrogenated tallow glutamate, perfluoroalkyl phosphates, perfluoroalkylsilanes, perfluoroalkylsilazanes, polyhexafluoropropylene oxides, polyorganosiloxanes comprising perfluoroalkyl perfluoropolyether groups, and amino acids; N-acylamino acids or salts thereof; lecithin, isopropyl triisostearyl titanate, and mixtures thereof.

The N-acylamino acids can comprise an acyl group containing from 8 to 22 carbon atoms, such as, for example, a 2-ethylhexanoyl, caproyl, lauroyl, myristoyl, palmitoyl, stearoyl or cocoyl group. The salts of these compounds may be aluminium, magnesium, calcium, zirconium, zinc, sodium or potassium salts. The amino acid may be, for example, lysine, glutamic acid or alanine.

The term "alkyl" mentioned in the compounds cited above in particular denotes an alkyl group containing from 1 to 30 carbon atoms and preferably containing from 5 to 16 carbon atoms.

Hydrophobically treated pigments are described in particular in patent application EP-A-1 086 683.

Nacres

For the purposes of the present patent application, the term "nacre" means coloured particles of any shape, which may or may not be iridescent, in particular produced by certain molluscs in their shell, or alternatively synthesized, and which have a colour effect via optical interference.

Examples of nacres that may be mentioned include nacreous pigments such as titanium mica coated with an iron oxide, mica coated with bismuth oxychloride, titanium mica coated with chromium oxide, titanium mica coated with an organic dye in particular of the abovementioned type, and also nacreous pigments based on bismuth oxychloride.

They may also be mica particles, at the surface of which are superposed at least two successive layers of metal oxides and/or of organic colorants.

The nacres may more particularly have a yellow, pink, red, bronze, orangey, brown, gold and/or coppery colour or tint.

As illustrations of nacres that may be introduced as interference pigments into the first composition, mention may be made of the gold-coloured nacres sold in particular by the company BASF under the name Brilliant gold 212G (Timica), Gold 222C (Cloisonne), Sparkle gold (Timica) and Monarch gold 233X (Cloisonne); the bronze nacres sold in particular by the company Merck under the name Bronze fine (17384) (Colorona) and Bronze (17353) (Colorona) and by the company BASF under the name Super bronze (Cloisonne); the orange nacres sold in particular by the company BASF under the name Orange 363C (Cloisonne) and by the company Merck under the name Passion orange (Colorona) and Matte orange (17449) (Microna); the brown tinted nacres sold in particular by the company Engelhard under the name Nu-antique copper 340XB (Cloisonne) and Brown CL4509 (Chroma-lite); the copper-tinted nacres sold in particular by the company BASF under the name Copper 340A (Timica); the red-tinted nacres sold in particular by the company Merck under the name Sienna fine (17386) (Colorona); the yellow-tinted nacres sold in particular by the company BASF under the name Yellow (4502) (Chromalite); the gold-tinted red nacres sold in particular by the company BASF under the name Sunstone G012 (Gemtone); the pink nacres sold in particular by the company BASF under the name Tan opal G005 (Gemtone); the gold-tinted black nacres sold in particular by the company BASF under the name Nu antique bronze 240 AB (Timica), the blue nacres sold in particular by the company Merck under the name Matte blue (17433) (Microna), the silvery-tinted white nacres sold in particular by the company Merck under the name Xirona Silver, and the golden-green pink-orange nacres sold in particular by the company Merck under the name Indian summer (Xirona), and mixtures thereof.

According to a preferred embodiment, the colorant used in the present invention is selected from metal oxide pigments, organic lakes, synthetic or natural water-soluble dyes and mixtures thereof.

According to a particularly preferred embodiment, the colorant used in the present invention is selected from YELLOW 6 LAKE, Blue 1 lake, RED 28 LAKE, RED 21, RED 7, titanium dioxide, iron oxides, synthetic fluorphlogopite, and mixtures thereof.

If presents, the colorant is present in an amount ranging from 1 wt. % to 20 wt. %, preferably from 2 wt. % to 10 wt. %, relative to the total weight of the composition.

Other Ingredients

The solid anhydrous composition according to the present invention may further comprise other ingredient(s) usually used in the field under consideration.

For example, the solid anhydrous composition according to the present invention may further comprises other ingredients selected from thickeners, antioxidants (such as tocopherols, tocopheryl acetate, pentaerythrityl tetra-di-t-butyl hydroxyhydrocinnamate), film former (such as trimethylsiloxysilicate), preserving agents, anti-bacterial agents (such as capryly glycol, ethylhexylglycerin), fragrances, neutralizers, antiseptics, additional cosmetic active agents, such as vitamins, collagen-protecting agents, and mixtures thereof.

It is a matter of routine operations for a person skilled in the art to adjust the nature and amount of the other ingredients present in the compositions in accordance with the present invention such that the advantageous properties of the composition used according to the present invention are not, or are not substantially, adversely affected by the envisaged addition.

According to a preferred embodiment, the present invention provides an anhydrous composition comprising, relative to the total weight of the composition:
a) from 2 wt. % to 5 wt. % of vinyl dimethicone/methicone silsesquioxane Crosspolymer;
b) from 6 wt. % to 10 wt. % of organopolysiloxane elastomer conveyed in a first oil selected from dimethicone/vinyl dimethicone crosspolymer, dimethicone crosspolymer, and mixtures thereof;
c) from 15 wt. % to 20 wt. % of at least two filler including polymethylsilsesquioxane and calcium aluminum borosilicate and other filler(s) selected from talc, mica, silica, polyamide powders, hexamethylene diisocyanate/trimethylol hexyllactone copolymer, and mixture thereof;
d) from 10 wt. % to 25 wt. % of volatile hydrocarbon oil selected from ododecane, isodecane and isohexadecane, and mixtures thereof;
e) from 10 wt. % to 25 wt. % of non-volatile hydrocarbon oil selected from isostearyl isostearate, diisostearyl malate, hydrogenated polyisobutenes, and mixtures thereof; and
f) from 2 wt. % to 10 wt. % of a colorant selected from YELLOW 6 LAKE, Blue 1 lake, RED 28 LAKE, RED 21, RED 7, titanium dioxide, iron oxides, synthetic fluorphlogopite, and mixtures thereof,
wherein the composition does not comprise a wax and a pasty compound.

Galenic Form

The composition of the present invention is suitable to be used as a skin care and/or make up product. More particularly, the composition of the present invention is liquid lip balms.

The composition according to the present invention may be prepared in a conventional manner.

According to the second aspect, the present invention provides a cosmetic process for caring for/making up keratin materials comprising applying the solid anhydrous composition as described above to the keratin materials.

In particular, the keratin materials are lips.

The examples that follow are given as non-limiting illustrations of the present invention.

EXAMPLES

Main raw materials used, trade names and supplier thereof are listed in Table 1.

TABLE 1

| INCI US | Trade name | supplier |
|---|---|---|
| DIMETHICONE (and) DIMETHICONE/VINYL DIMETHICONE CROSSPOLYMER | KSG 16 | SHIN ETSU |
| DIMETHICONE (and) DIMETHICONE CROSSPOLYMER | DOWSIL ™ EL-9241 DM SILICONE ELASTOMER BLEND | DOW CORNING (DOW CHEMICAL) |
| ISODODECANE | ISODODECANE | INEOS |
| DIISOSTEARYL MALATE | SCHERCEMOL ™ DISM ESTER | LUBRIZOL |
| HYDROGENATED POLYISOBUTENE | PARLEAM | NOF CORPORATION |
| HDI/TRIMETHYLOL HEXYLLACTONE CROSSPOLYMER | D-400 | TOSHIKI PIGMENT |
| TALC | IMERCARE ® PHARMA 00T | IMERYS |
| SILICA | SUNSPHERE H 51 | AGC SI-TECH |
| VINYL DIMETHICONE/METHICONE SILSESQUIOXANE CROSSPOLYMER | KSP 100 | SHIN ETSU |
| TRIMETHYLSILOXYSILICATE | BELSIL ® TMS 803 | WACKER |
| ISOSTEARYL ISOSTEARATE | ISOSTEARYL ISOSTEARATE | GATTEFOSSE |
| MICA | MEARLMICA ® SV | BASF PERSONAL CARE INGREDIENTS |
| NYLON-12 | SP - 500 | TORAY INDUSTRIES |
| POLYMETHYLSILSESQUIOXANE | TOSPEARL 145A MICROSPHERE | MOMENTIVE PERFORMANCE MATERIALS |
| PENTYLENE GLYCOL | PENTYLENE GLYCOL | AROMA HOLLY LIMITED |
| ETHYLHEXYLGLYCERIN | SENSIVA ® SC 50 | SCHULKE & MAYR |
| CAPRYLYL GLYCOL | CLEANBIO-CG | KOLON LIFE SCIENCE |
| CALCIUM ALUMINUM BOROSILICATE | LUXSIL COSMETIC MICROSPHERES | POTTERS INDUSTRIES |
| FRAGRANCE | 644058 BAISER SUCRE | DROM |
| TOCOPHERYL ACETATE | DL ALPHA TOCOPHERYL ACETATE (0420085) | DSM NUTRITIONAL PRODUCTS |
| PENTAERYTHRITYL TETRA-DI-T-BUTYL HYDROXYHYDROCINNAMATE | TINOGARD TT | BASF |

Invention Example 1 and Comparative Examples 1-2

Liquid lip composition of invention example (IE.) 1 and comparative examples (CE.) 1-2 were prepared with the ingredients listed in Table 2.

TABLE 2

| INCI | Cosmetic type | IE. 1 | CE. 1 | CE. 2 |
|---|---|---|---|---|
| IRON OXIDES | DYE/PIGMENT | 3.6 | 3.6 | 3.6 |
| RED 7 | DYE/PIGMENT | 0.7 | 0.7 | 0.7 |
| FRAGRANCE | FRAGRANCE | 0.1 | 0.2 | 0.2 |
| TOCOPHERYL ACETATE | ADDITIVES | 0.1 | — | — |
| TRIMETHYLSILOXYSILICATE | FILM FORMER | 3.0 | — | — |
| PENTAERYTHRITYL TETRA-DI-T-BUTYL HYDROXYHYDROCINNAMATE | ANTI-OXIDANT | 0.04 | 0.04 | 0.04 |
| BIS-DIGLYCERYL POLYACYLADIPATE-2 | PASTY COMPOUND | — | q.s. 100 | q.s. 100 |
| POLYETHYLENE | WAX | — | 2.0 | 2.0 |
| HYDROGENATED POLYISOBUTENE | HYDROCARBON OIL | 6.4 | 6.5 | 6.8 |
| PHENYL TRIMETHICONE | SILICON | — | 4.4 | 4.7 |
| ISODODECANE | HYDROCARBON OIL | q.s. 100 | — | — |
| DIISOSTEARYL MALATE | HYDROCARBON OIL | 6.8 | 6.9 | 7.3 |
| ISOSTEARYL ISOSTEARATE | HYDROCARBON OIL | 2.9 | 2.9 | 3.1 |
| DIMETHICONE (and) DIMETHICONE/VINYL DIMETHICONE CROSSPOLYMER* | SILICON ELASTOMER | 20.00 | 20.00 | — |
| DIMETHICONE (and) DIMETHICONE CROSSPOLYMER** | SILICON ELASTOMER | 20.00 | 20.00 | 40 |
| ETHYLHEXYLGLYCERIN | ADDITIVES | 0.50 | 0.50 | 0.50 |
| PENTYLENE GLYCOL | ADDITIVES | 1.00 | 1.00 | 1.00 |
| CAPRYLYL GLYCOL | ADDITIVES | 0.50 | 0.50 | 0.50 |
| VINYL DIMETHICONE/METHICONE SILSESQUIOXANE CROSSPOLYMER | FILLER | 3.00 | 3.00 | 2.00 |
| HDI/TRIMETHYLOL HEXYLLACTONE CROSSPOLYMER | FILLER | 4.00 | 4.00 | 4.00 |
| POLYMETHYLSILSESQUIOXANE | FILLER | 1.00 | 1.00 | — |
| MICA | FILLER | 2.00 | 2.00 | 2.00 |
| KAOLIN | FILLER | — | — | 4.00 |
| TALC | FILLER | 4.00 | 4.00 | — |
| NYLON-12 | FILLER | 1.50 | 1.50 | 1.50 |
| SILICA | FILLER | 3.60 | — | — |
| CALCIUM ALUMINUM BOROSILICATE | FILLER | 0.30 | — | — |

*The content of DIMETHICONE/VINYL DIMETHICONE CROSSPOLYMER is 24 wt. %, based on the total weight of DIMETHICONE (and) DIMETHICONE/VINYL DIMETHICONE CROSSPOLYMER.
**The content of DIMETHICONE CROSSPOLYMER is 15 wt. %, based on the total weight of DIMETHICONE (and) DIMETHICONE CROSSPOLYMER.

Preparation procedure:

The detailed procedure of preparing above compositions is as below, taking composition 1 as an example:

1) In a first stage, the pigments were ground in a triple roll mill in a portion of the oily phase (hydrogenated polyisobutene, diisostearyl malate, isostearyl isostearate and pentaerythrityl tetra-di-t-butyl hydroxyhydrocinnamate);
2) The remainder of the oil-soluble ingredients were then mixed with the rest of the oily phase & the ground pigmentary material until a homogeneous mixture was obtained;
3) adding organopolysiloxane elastomer with stirring in the mixture mentioned above, the ground pigmentary material was then incorporated into the mixture and homogenization was continued until the mixture was homogeneous;
4) adding fillers, film former, co-preservatives, antioxidant, actives, fragrance with stirring till uniform;
5) finally, the composition obtained was poured into small pots and then placed at ambient temperature for 24 h.

Evaluation:

Evaluation on the spreadability, shininess, and heaviness of the compositions prepared were performed.

Spreadability

Spreadability is used to evaluate whether a lip composition can slide easily and smoothly during application on the lips.

Spreadability was evaluated by 5 experts as follows: slowly applying the lip composition on the upper lip to both sides twice using the same force, while feeling carefully the force between the lip composition and the lip during the second application. The weaker friction force, the better the spreadability.

Shininess and Heaviness

Shininess is used to evaluate the degree of light reflection or brightness on lips under standard light.

Heaviness is used to evaluate the weight feeling on lips brought by lip products. It is a feeling that lips are burdened and cannot breathe freely.

Shininess and heaviness were evaluated by 5 experts by applying a lipstick on the upper lip to both sides twice using the same force. After application, do not move the lips for 3 minutes, and check the degree of light reflection or brightness on the middle of the upper lip under standard light, the heaviness was also checked at the same time. The less of light reflection or brightness, the less the shininess, and the better the matte effect. The less heaviness, the better.

Finally, comments or scores were given by the experts on spreadability, shininess, and heaviness based on the following standards and averaged:

5: very good;
4: basically good;
3: acceptable;
2: slightly poor and not acceptable;
1: poor, not acceptable.

The evaluation results of each lip composition were summarized in the Table 3.

TABLE 3

| Properties | IE. 1 | CE. 1 | CE. 3 |
|---|---|---|---|
| Spreadability | 5 | 4 | 4 |
| Heaviness | 4 | 2 | 2 |
| Shininess | 4 | 1 | 1 |

It can be seen that lip composition of invention example has good spreadability, and can leave a matte and lightweight deposit on keratin materials.

The invention claimed is:

1. An anhydrous composition for caring for and/or making up keratin materials, which is liquid and comprises:
   a) at least one organopolysiloxane elastomer powder coated with a silicone resin;
   b) at least one organopolysiloxane elastomer conveyed in a first oil;
   c) at least two fillers including polymethylsilsesquioxane and calcium aluminum borosilicate; and
   d) at least one second oil, which is a volatile hydrocarbon oil,
   wherein the composition does not comprise a wax and comprises more than 15 wt. % of fillers, relative to the total weight of the composition.

2. The composition according to claim 1, which does not comprise a pasty compound.

3. The composition according to claim 1, wherein the organopolysiloxane elastomer is obtained by crosslinking addition reaction of (A1) diorganopolysiloxane containing at least two ethylenically unsaturated groups bonded to silicon, and (B1) diorganopolysiloxane containing at least two hydrogens each bonded to a silicon,.

4. The composition according to claim 1, wherein the organopolysiloxane elastomer powder coated with a silicone resin is vinyl dimethicone/methicone silsesquioxane crosspolymer.

5. The composition according to claim 1 4, wherein the organopolysiloxane elastomer powder coated with silicone resin is present in an amount ranging from 0.5 wt relative to the total weight of the composition.

6. The composition according to claim 1, wherein the type of organopolysiloxane elastomer conveyed in the first oil is selected from dimethicone/vinyl dimethicone crosspolymer, dimethicone crosspolymer, and mixtures thereof.

7. The composition according to claim 1, wherein the organopolysiloxane elastomer conveyed in the first oil is present in the composition in an amount ranging from 2 wt. % to 20 wt. %, relative to the total weight of the composition.

8. The composition according to claim 1, wherein the non-powder type organopolysiloxane elastomer(s) and the organopolysiloxane elastomer(s) powder coated with a silicone resin can be present in a ratio by weight of between 2 and 5.

9. The composition according to claim 1, wherein the composition comprises 0.1 wt. %-5 wt. %, of polymethylsilsesquioxane, and 0.1 wt. %-5 wt. %, of calcium aluminum borosilicate, relative to the total weight of the composition.

10. The composition according to claim 1 9, wherein the composition further comprises at least one filler selected from the group consisting of talc, mica, silica, polyamide powders, copolymers comprising trimethylol hexyllactone, and mixture thereof.

11. The composition according to claim 1, wherein the at least two fillers including polymethylsilsesquioxane and calcium aluminum borosilicate is present in an amount ranging from 15 wt. % to 30 wt. %, relative to the total weight of the composition.

12. The composition according to claim 1, wherein the second oil is present in an amount ranging from 10 wt. % to 40 wt. %, relative to the total weight of the composition.

13. The composition according to claim 1, further comprising at least one of (i) a non-volatile hydrocarbon oil; (ii) a hydrophilic moisturizer; (iii) colorant, and (iv) mixtures thereof.

14. The composition according to claim 1 comprising, relative to the total weight of the composition:
   a) from 2 wt. % to 5 wt. % of vinyl dimethicone/methicone silsesquioxane Crosspolymer;
   b) from 6 wt. % to 10 wt. % of organopolysiloxane elastomer conveyed in the first oil selected from dimethicone/vinyl dimethicone crosspolymer, dimethicone crosspolymer, and mixtures thereof;
   c) from 15 wt. % to 20 wt. % of at least two fillers including polymethylsilsesquioxane and calcium aluminum borosilicate and other filler(s) selected from the group consisting of talc, mica, silica, polyamide powders, hexamethylene diisocyanate/trimethylol hexyllactone copolymer, and mixture thereof;
   d) from 10 wt. % to 25 wt. % of volatile hydrocarbon oil selected from ododecane, isodecane and isohexadecane, and mixtures thereof;
   e) from 10 wt. % to 25 wt. % of non-volatile hydrocarbon oil selected from the group consisting of isostearyl isostearate, diisostearyl malate, hydrogenated polyisobutenes, and mixtures thereof; and
   f) from 2 wt. % to 10 wt. % of a colorant selected from the group consisting of YELLOW 6 LAKE, Blue 1 lake, RED 28 LAKE, RED 21, RED 7, titanium dioxide, iron oxides, synthetic fluorphlogopite, and mixtures thereof,
   wherein the composition does not comprise a wax and a pasty compound.

15. A cosmetic process for caring for and/or making up keratin materials comprising applying the composition as defined in claim 1 to the keratin materials.

* * * * *